(12) United States Patent  
Sim et al.

(10) Patent No.: US 10,409,478 B2  
(45) Date of Patent: Sep. 10, 2019

(54) METHOD, APPARATUS, AND RECORDING MEDIUM FOR SCRAPPING CONTENT

(71) Applicant: Samsung Electronics Co., Ltd., Gyeonggi-do (KR)

(72) Inventors: Bo-Hyun Sim, Incheon (KR); Seung-Kyung Lim, Seoul (KR); Si-Hak Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 14/473,980

(22) Filed: Aug. 29, 2014

(65) Prior Publication Data

US 2015/0067615 A1  Mar. 5, 2015

(30) Foreign Application Priority Data

Aug. 29, 2013 (KR) .................. 10-2013-0103290

(51) Int. Cl.
| | | |
|---|---|---|
| G06F 3/033 | (2013.01) | |
| G06F 3/0488 | (2013.01) | |
| G06F 3/0484 | (2013.01) | |

(52) U.S. Cl.
CPC ...... G06F 3/04883 (2013.01); *G06F 3/04842* (2013.01)

(58) Field of Classification Search
CPC ...................................................... G06F 3/0481
USPC ........................................................ 715/863
See application file for complete search history.

(56) References Cited

U.S. PATENT DOCUMENTS

| | | | | |
|---|---|---|---|---|
| 5,506,952 A | * | 4/1996 | Choy | .......... G06F 8/34 715/763 |
| 2003/0156479 A1 | * | 8/2003 | Fujiyoshi | ............ G06F 3/04817 365/200 |
| 2008/0013864 A1 | * | 1/2008 | Oh | ..................... G06F 17/30274 382/305 |
| 2008/0104571 A1 | * | 5/2008 | Jaeger | ................... G06F 3/0481 717/113 |
| 2012/0096400 A1 | | 4/2012 | Cho | |

FOREIGN PATENT DOCUMENTS

| | | |
|---|---|---|
| KR | 10-2013-0020380 | 2/2013 |
| KR | 10-2013-0052743 | 5/2013 |
| WO | WO 2010/107653 A2 | 9/2010 |

* cited by examiner

*Primary Examiner* — Andrey Belousov (57) ABSTRACT

A content scraping method includes recognizing a touch trace made on a screen according to a touch location moving to correspond to a touch input and selecting and storing at least one content located on the touch trace.

17 Claims, 8 Drawing Sheets

METHOD, APPARATUS, AND RECORDING MEDIUM FOR SCRAPPING CONTENT

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Aug. 29, 2013 and assigned Serial No. 10-2013-0103290, the entire disclosure of which is incorporated herein by reference.

TECHNICAL FIELD

The present disclosure relates generally to a method, apparatus, and recording medium for easily scrapping contents displayed on a screen.

BACKGROUND

With development of various functions for a mobile terminal, a mobile terminal has evolved to a multimedia device having multiple functions, such as photographing still images or moving images, playing music files or video files, playing games, and receiving broadcasting signals. Accordingly, the mobile terminal displays various contents on a screen such that a user can edit and use the contents displayed on the screen as necessary.

In the related art, in order to scrap desired one of contents displayed on a screen, a user should make drawing on the desired content using an electronic pen to scrap an area on which the drawing has been made. That is, in the related art, no function of simultaneously scrapping a plurality of contents was provided. Herein, "scrapping" is similar to a capturing function, and means selecting and storing specific content according to a user's manipulation. Also, "drawing" is to touch a specific location and drag to a new location using an electronic pen such that a mobile terminal can recognize coordinates corresponding to touch inputs that are successively made. For example, in the related art, in order to scrap a quadrangle image using an electronic pen, a user should make drawing on the individual sides of the quadrangle image or edit the quadrangle image.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method, apparatus, and recording medium for enabling a user to accurately scrap content in its original state using a drawing function.

In accordance with an aspect of the present disclosure, a content scraping method includes recognizing a touch trace made on a screen according to a touch location moving to correspond to a touch input; and selecting and storing at least one content located on the touch trace.

In accordance with another aspect of the present disclosure, a content scraping apparatus includes a touch screen; a storage unit; and a controller configured to recognize a touch trace made on a screen of the touch screen according to a touch location moving to correspond to a touch input, and to select at least one content located on the touch trace, and to store the selected content in the storage unit.

In accordance with still another aspect of the present disclosure, a content scrap recording medium storing a program for operating: a touch screen; a storage unit; and a controller configured to recognize a touch trace made on a screen of the touch screen according to a touch location moving to correspond to a touch input, to select at least one content located on the touch trace, and to store the selected content in the storage unit.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged method or system. The following description with reference to the accompanying drawings is provided to assist in a comprehensive understanding of example embodiments of the disclosure as defined by the claims and their equivalents. It includes various specific details to assist in that understanding but these are to be regarded as merely examples. Accordingly, those of ordinary skilled in the art will recognize that various changes and modifications of the embodiments described herein, including changes of names such as contents and editing functions and details of components, can be made without departing from the scope and spirit of the disclosure. In addition, descriptions of well-known functions and constructions may be omitted for clarity and conciseness.

Figure 1:
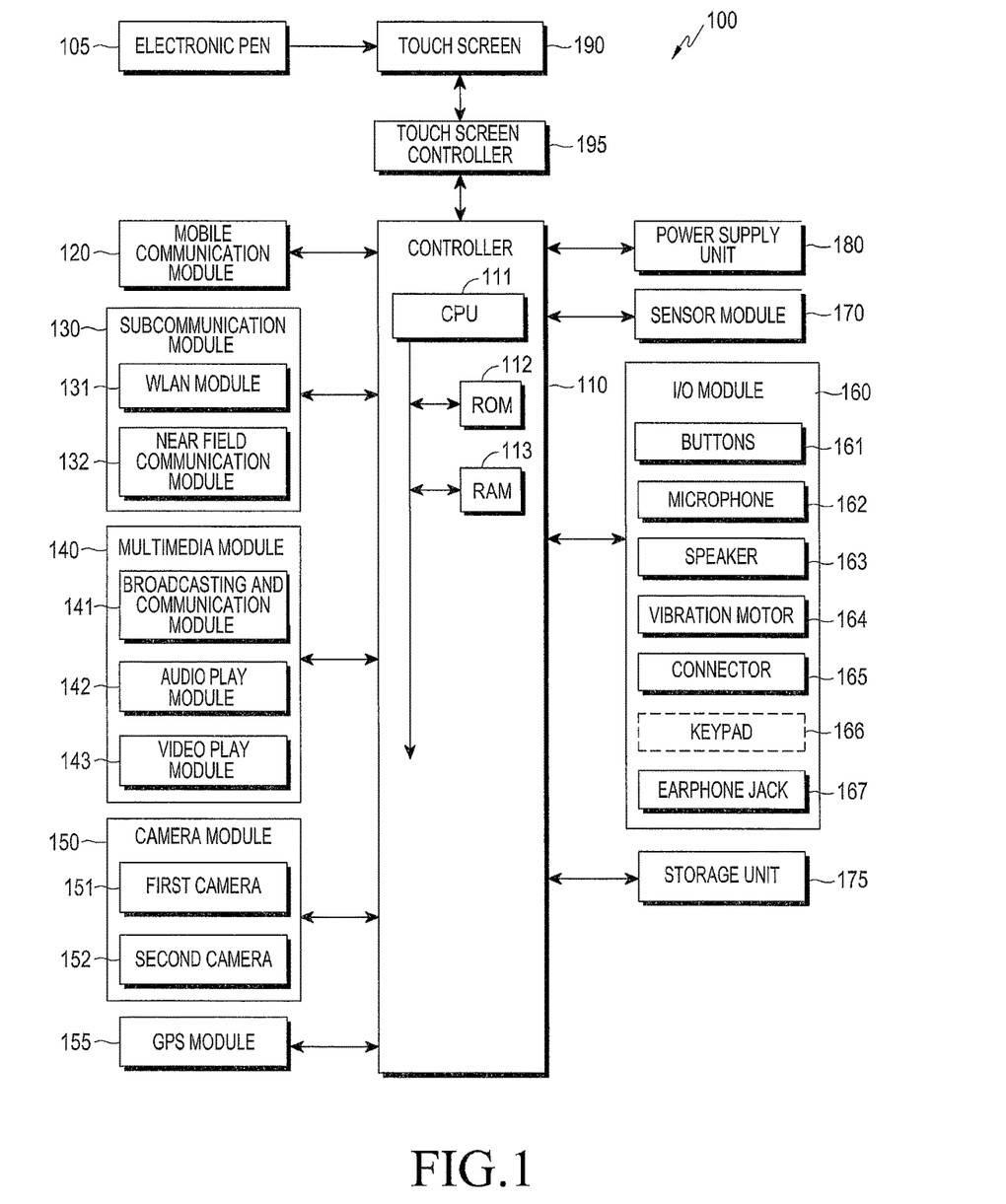
FIG. 1 illustrates a block diagram of a configuration of a mobile terminal that performs a content scraping method, according to an embodiment of the present disclosure.

FIG. 1 illustrates a block diagram of a configuration of a mobile terminal that performs a content scraping method, according to an embodiment of the present disclosure. Referring to FIG. 1, a mobile terminal 100 may include a controller 110, a mobile communication module 120, a sub communication module 130, a multimedia module 140, a camera module 150, a Global Positioning System (GPS) module 155, an input/output module 160, a sensor module 170, a storage unit 175, a power supply unit 180, a display unit 190, and a display controller 195. The sub communication module 130 may include at least one of a Wireless Local Area Network (WLAN) module 131 and a short-range communication module 132. The multimedia module 140 may include at least one of a broadcasting and communication module 141, an audio play module 142, and a video play module 143. The camera module 150 may include at least one of a first camera 151 and a second camera 152. The input/output module 160 may include at least one among one or more buttons 161, a microphone 162, a speaker 163, a vibration device 164, a connector 165, a keypad 166, and an earphone jack 167. In the following description, it is assumed that the display unit 190 and the display controller 195 are a touch screen and a touch screen controller, respectively.

The power supply unit 180 may supply power to one or more batteries (not shown) mounted in the housing of the mobile terminal 100, under the control of the controller 110. The one or more batteries supply power to the mobile terminal 100. The power supply unit 180 may supply power received from an external power source (not shown) to the mobile terminal 100 through a wired cable connected to the connector 165. The power supply unit 180 may supply power received wirelessly from an external power source to the mobile terminal 100 through wireless charging technology.

The camera module 150 may include at least one of the first camera 151 and the second camera 152 for photographing still images or moving images, under the control of the controller 110.

The multimedia module 140 may include, as described above, the broadcasting and communication module 141, the audio play module 142, or the video play module 143. The broadcasting communication module 141, under the control of the controller 110, may receive broadcasting signals (for example, TV broadcasting signals, radio broadcasting signals, or data broadcasting signals) and additional broadcasting information (for example, an Electric Program Guide (EPG) or an Electric Service Guide (ESG)) transmitted from a broadcasting station through a broadcasting communication antenna (not shown). The audio play module 142, under the control of the controller 110, may play a digital audio file (with a file extension of, for example, ".mp3", ".wma", ".ogg", or ".wav") that is stored in the storage unit 175 or received from the outside. The video play module 143, under the control of the controller 110, may play a digital video file (with a file extension of, for example, ".mpeg", ".mpg" ".mp4", ".avi", ".mov", or ".mkv") or a digital audio file that is stored in the storage unit 175 or received from the outside. The multimedia module 140 may be incorporated into the controller 110.

The multimedia module 140 may include the audio play module 142 and the video play module 143, excluding the broadcasting and communication module 141. The audio play module 142 or the video play module 143 of the multimedia module 140 may be incorporated into the controller 110.

The mobile communication module 120 enables the mobile terminal 100 to connect to an external device through mobile communication using at least one antenna (not shown), under the control of the controller 110. The mobile communication module 120 may transmit/receive radio signals for voice calls, video calls, Short Message Service (SMS) messages, or Multimedia Message Service (MMS) messages to/from a mobile phone, a smart phone, a tablet PC, or another device, a phone number of each of which is entered or registered in the mobile terminal 100. Also, the mobile communication module 120, under the control of the controller 110, may connect to the wireless Internet or transmit/receive RF signals to/from adjacent devices in a wireless fashion at a place at which a wireless Access Point (AP) is installed, through Wireless Fidelity (Wi-Fi) or a 3G/4G data network.

The sub communication module 130 may include, as described above, at least one of the WLAN module 131 and the short-range communication module 132.

The WLAN module 131, under the control of the controller 110, may connect to the Internet at a place in which a wireless AP (not shown) is installed. The WLAN module 131 supports IEEE802.11x. The short-range communication module 132 may perform wireless short-range communication between mobile terminals under the control of the controller 110.

The mobile terminal 100 may include at least one of the mobile communication module 120, the WLAN module 131, and the short-range communication module 132, according to performance. For example, the mobile terminal 100 may include a combination of the mobile communication module 120, the WLAN module 131, and the short-range communication module 132, according to performance.

The GPS module 155 may receive radio waves from a plurality of GPS satellites (not shown) on the orbit around the earth, and calculate the location of the mobile terminal 100 based on a time of arrival of the radio waves from the GPS satellites to the mobile terminal 100.

The sensor module 170 may include at least one sensor for detecting a status of the mobile terminal 100. For example, the sensor module 170 may include at least one sensor among a proximity sensor (not shown) for determining whether a user approaches the mobile terminal 100, a motion sensor (not shown) for detecting motion (rotation, acceleration, or vibration) of the mobile terminal 100, an ambient light sensor (not shown) for measuring an amount of ambient light around the mobile terminal 100, a gravity sensor (not shown) for detecting a direction in which gravity is applied, and an altimeter (not shown) for measuring atmospheric pressure to detect an altitude. The sensor module 170 may further include a geo-magnetic sensor (not shown) for detecting a point of the compass of the mobile terminal 100 using the earth's magnetic field, and an inertia sensor (not shown) for measuring angular displacement or a change in angular displacement in a predetermined direction. The sensor module 170 may further include other sensors or omit some of the above-mentioned sensors according to performance of the mobile terminal 100.

The input/output module 160 may include, as described above, at least one among the buttons 161, the microphone 162, the speaker 163, the vibration device 164, the connector 165, the keypad 166, and the earphone jack 167.

The buttons 161 may be provided in the front, side, and/or rear part of the housing of the mobile terminal 100. The buttons 161 may include at least one of a power/lock button (not shown), volume buttons (not shown), a menu button (not shown), a home button (not shown), a back button (not shown), and a search button (not shown).

The microphone 162 may receive voice or sound to generate an electrical signal, under the control of the controller 110.

The speaker 163 may be provided as at least one unit at an appropriate location (or locations) on the housing of the mobile terminal 100. The speaker 163, under the control of the controller 110, may receive sound corresponding to various signals (e.g., radio signals, broadcasting signals, a digital audio file, a digital video file, or photo-shooting tones) from the mobile communication module 120, the sub communication module 130, the multimedia module 140, or the camera module 150, and output the sound to the outside of the mobile terminal 100. Also, the speaker 163 may output sound (e.g., button manipulation tones or ring back tones) corresponding to a function that is performed by the mobile terminal 100.

The vibration motor 164 converts an electrical signal into mechanical vibrations under the control of the controller 110. For example, when the mobile terminal 100 is in a vibration mode, the vibration device 164 may operate if a voice call or a video call is received from another device (not shown). The vibration device 164 may be provided as at least one unit in the housing of the mobile terminal 100. The vibration device 164 may operate in response to a user's touch input of touching the touch screen 190 or a user's touch-and-drag input of touching and dragging the touch screen 190.

The connector 165 may be used as an interface for connecting the mobile terminal 100 to an external electronic device (not shown) or a power source (not shown). The mobile terminal 100 may transmit data stored in the storage unit 175 of the mobile terminal 100 to an external electronic device (not shown) through a wired cable connected to the connector 165, under the control of the controller 110, or the mobile terminal 100 may receive data of an external electronic device through the wired cable connected to the connector 165. The mobile terminal 100 may receive power or charge a battery (not shown) from a power source (not shown) through the wired cable connected to the connector 165.

The keypad 166 may receive key input from a user in order to control the mobile terminal 100. The keypad 166 may be a physical keypad (not shown) that is provided on the mobile terminal 100, or a virtual keypad (not shown) that is displayed on the touch screen 190. The mobile terminal 100 may include no physical keypad according to a structure or performance of the mobile terminal 100.

An earphone (not shown) may be inserted into the earphone jack 167 to connect to the mobile terminal 100.

The touch screen 190 may receive a user's manipulations, and display an execution image, an operating state, and a menu state of an application program. That is, the touch screen 190 may provide a user with GUIs corresponding to various services (for example, a call, data transmission, broadcasting, and photographing). The touch screen 190 may output an analog signal corresponding to at least one touch input inputted to a GUI to the touch screen controller 195. The touch screen 190 may receive at least one touch input through a user's body part (for example, a finger including a thumb) or a pointing unit (for example, an electronic pen 105). Also, the touch screen 190 may receive a touch input. In this embodiment, the touch screen 190 may transmit an analog signal corresponding to the touch input to the touch screen controller 195.

In this specification, the term "touch" is not limited to a contact of a user's body part or the electronic pen 105 to the touch screen 190, and may include non-contact recognition. A recognition distance in which the touch screen 190 can recognize the user's body part or the electronic pen 105 may depend on the performance or structure of the user terminal 100. In an embodiment, in order to distinguish a touch event occurred by a contact of a user's body part or the electronic pen 105 to the touch screen 190 from a hovering event occurred by non-contact recognition, the touch screen 190 is configured to output different values (e.g., current values) with respect to the touch event and the hovering event. Also, the touch screen 190 may output a value (e.g., a current value) depending on a distance between the touch screen 190 and a space where a hovering event has occurred. For example, the electronic pen 105 may include a button for distinguishing a hovering event from other events to detect the hovering event. When a user presses the button of the electronic pen 105, it is possible to distinguish a hovering event from other events and detect the hovering event.

The touch screen 190 may be a resistive touch screen, a capacitive touch screen, an Electro Magnetic Resonance (EMR) touch screen, an infrared touch screen, or an acoustic wave touch screen.

The touch screen controller 195 may convert an analog signal received from the touch screen 190 into a digital signal (e.g., X and Y coordinates), and transmit the digital signal to the controller 110. The controller 110 may control the touch screen 190 using the digital signal received from the touch screen controller 195. For example, the controller 110 may select a shortcut icon (not shown) displayed on the touch screen 190 or execute the shortcut icon, in response to a touch input or a hovering event. The touch screen controller 195 may be integrated with the controller 110.

The touch screen controller 195 may detect a value (e.g., a current value) output through the touch screen 190 to calculate a value of a distance between a space in which a hovering event has occurred and the touch screen 190, convert the distance value into a digital signal (e.g., Z coordinate), and provide the digital signal to the controller 110.

The touch screen 190 may also include at least two touch panels for respectively sensing touches or approaches of a user's body part and the electronic pen 105 so as to simultaneously receive inputs by the user's body part and the electronic pen 105. The at least two touch panels provide different output values to the touch screen controller 195, and the touch screen controller 195 recognizes the different output values received from the at least two touch panels to determine whether an input to the touch screen 190 is an input by a user's body part or an input by the electronic pen 105.

The storage unit 175 may store signals or data that is input/output according to operations of the mobile communication module 120, the sub communication module 130, the multimedia module 140, the camera module 150, the GPS module 155, the input/output module 160, the sensor module 170, and the touch screen 190, under the control of the controller 110. The storage unit 175 may store control programs and applications for controlling the mobile terminal 100 or the controller 110.

In this description, the term a "storage unit" includes the storage unit 175, Read Only Memory (ROM) 112 or Random Access Memory (RAM) 113 included in the controller 110, and a memory card (not shown, for example, a Secure Digital (SD) card or a memory stick) mounted in the mobile terminal 100. The storage unit 175 may be a non-volatile memory, a volatile memory, a Hard Disk Drive (HDD), or a Solid State Drive (SSD).

The controller 110 may include a Central Processing Unit (CPU) 111, the ROM 112 that stores control programs for controlling the mobile terminal 100, and the RAM 113 that temporarily stores signals/data received from the outside of the mobile terminal 100 or is used as a workspace for operations performed in the mobile terminal 100. The CPU 111 may be a single-core processor or a multi-core processor (e.g., a dual-core processor, a triple-core processor, or a quad-core processor). The CPU 111, the ROM 112, and the RAM 113 may be connected to each other through internal buses.

The controller 110 may control the mobile communication module 120, the sub communication module 130, the multimedia module 140, the camera module 150, the GPS module 155, the input/output module 160, the sensor module 170, the storage unit 175, the power supply unit 180, the touch screen 190, and the touch screen controller 195.

The controller 110 may recognize a touch trace made on a screen of the touch screen 190 according to a touch location moving to correspond to a touch input, select at least one content located on the touch trace, and store the selected content in the storage unit 175, using a content scraping method according to an embodiment of the present disclosure.

The controller 110 may display the content stored in the storage unit 175 on the screen of the touch screen 190.

Also, the controller 110 may display the touch trace on the screen of the touch screen 190.

Figure 2:
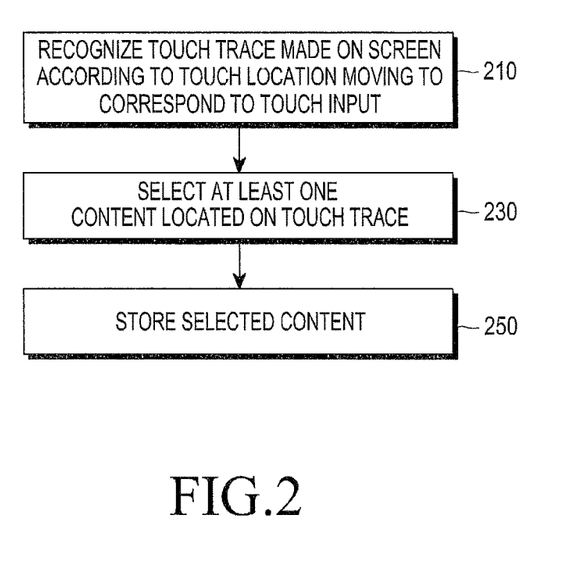
FIG. 2 illustrates a process for a content scraping method according to an embodiment of the present disclosure.

FIG. illustrates a process for a content scraping method according to an embodiment of the present disclosure. Referring to FIG. 2, in operation 210, a touch trace drawn on a screen according to a touch location moving to correspond to a touch input may be recognized. In an embodiment, when a specific location is touched and dragged to a new location, coordinates corresponding to touch inputs that are successively made may be recognized as a touch trace on a screen.

In this specification, the term "touch" is not limited to a contact of a user's body part or a pointing device (hereinafter, referred to as an electronic pen 105 (see FIG. 1)) to the touch screen 190, and may include non-contact recognition. Thereafter, in operation 230, at least one content located on the touch trace may be selected. The content may be predetermined content including text, an image, and a video. The content may be a plurality of contents included in a predetermined group. For example, text and an image may be classified into a group, and the group may be recognized as one content. Thereafter, in operation 250, the selected content may be stored.

According to an embodiment of the present disclosure, a user may make drawing on an area of desired content that is to be scrapped on a screen of the mobile terminal 100 (see FIG. 1), using his/her body part or the electronic pen 105, to thus scrap the desired content. The "drawing" is to touch a specific location on a screen and drag to a new location using a user's body part or the electronic pen 105 such that the mobile terminal 100 can recognize coordinates corresponding to touch inputs that are successively made. The "scrapping", which is similar to a capturing function, is to select and store an object located in an area in which drawing has been made on a screen according to the content scraping method.

Figure 3:
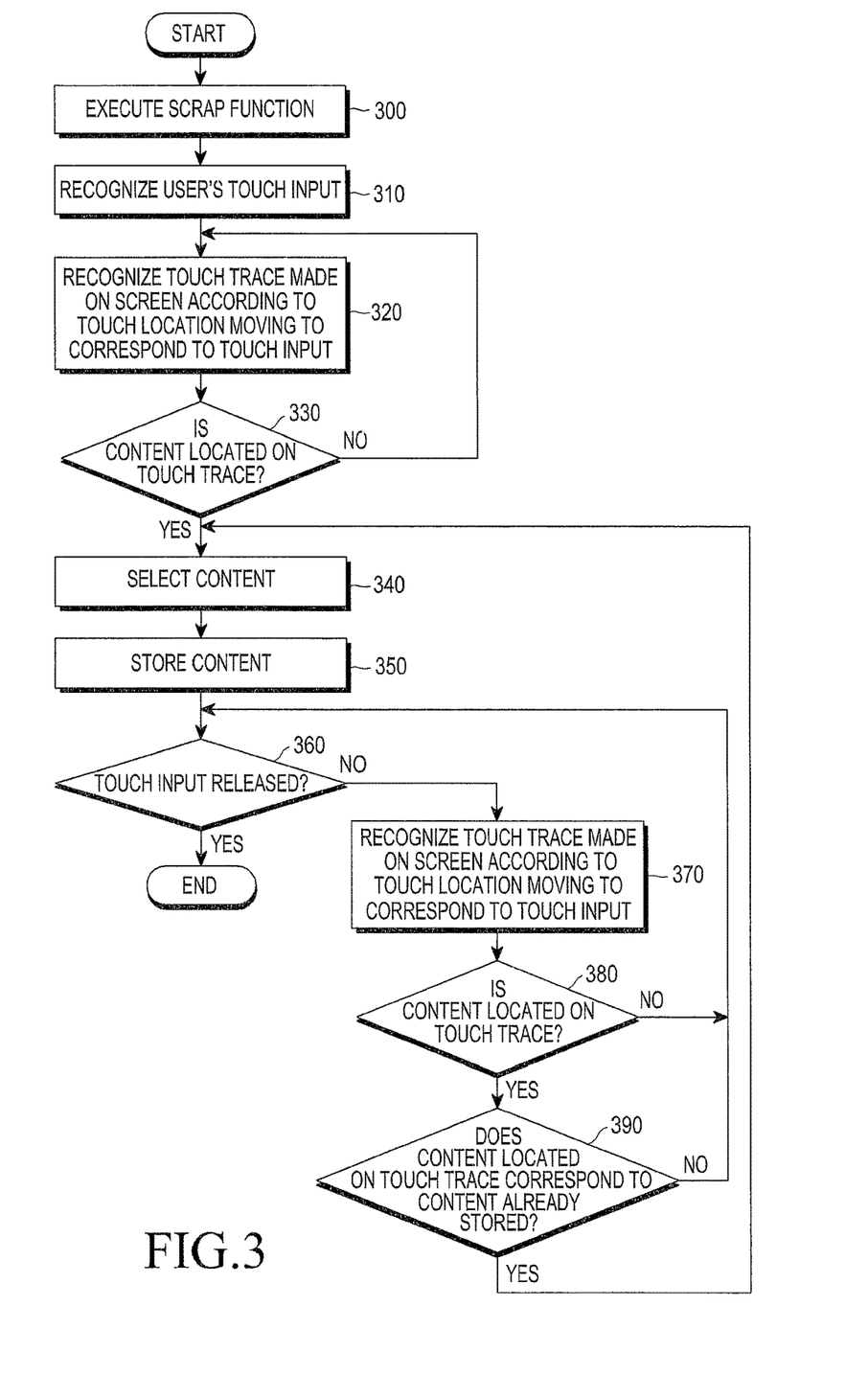
FIG. 3 illustrates a process for the content scraping method of FIG. 2 in detail, according to an embodiment of the present disclosure.
Figure 4A:
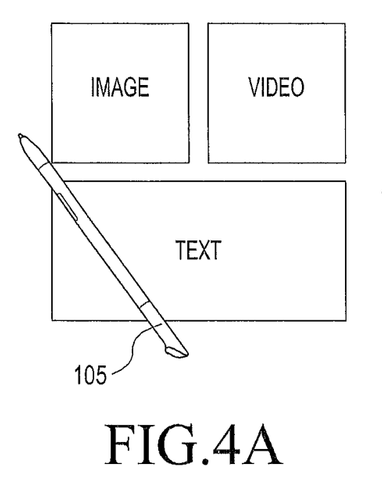
FIGS. 4A to 4D illustrate views for describing a content scraping method according to an embodiment of the present disclosure.
Figure 4B:
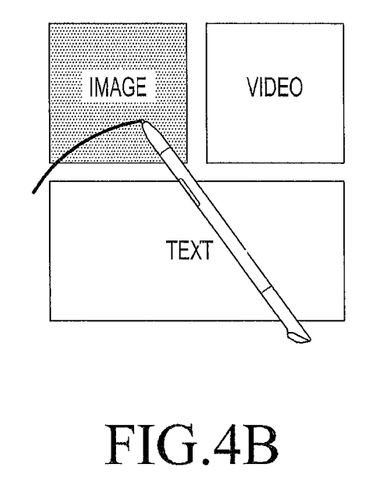
Figure 4C:
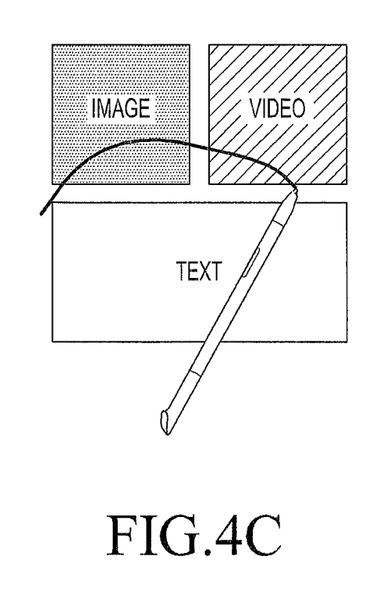
Figure 4D:
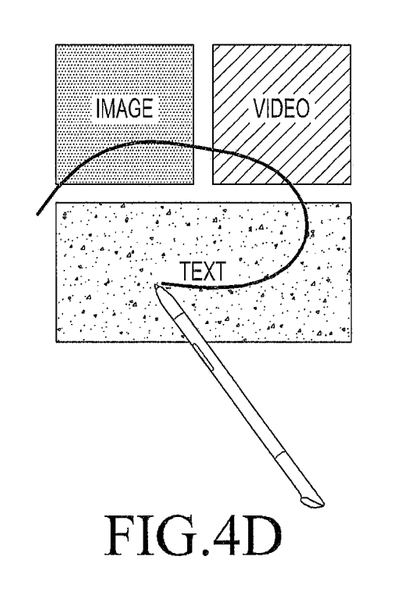

FIG. 3 illustrates a process for the content scraping method of FIG. 2 in detail, according to an embodiment of the present disclosure. Referring to FIG. 3, in operation 300, a scraping function may be executed. The scraping function is to select and store an object located in an area on which a user has made drawing. Thereafter, in operation 310, a user's touch input may be recognized. In operation 320, a touch trace drawn on a screen according to a touch location moving to correspond to a touch input may be recognized. In operation 330, it is determined whether content is located on the touch trace. If it is determined that content is located on the touch trace, the process may proceed to operation 340, and if it is determined that no content is located on the touch trace, the process may return to operation 320. In operation 340, the content located on the touch trace may be selected. In operation 350, the selected content may be stored. In operation 360, it is determined whether the touch input has been released. If it is determined that the touch input has been released, the process may terminate, and if it is determined that the touch input has not been released, the process may proceed to operation 370. In operation 370, a touch trace drawn on the screen according to the touch location moving to correspond to the touch input may be recognized. In operation 380, it is determined whether content is located on the touch trace. Operation 380 is aimed at preventing content already selected and stored from being again selected and stored when a touch trace is drawn on an area in which the already selected and stored content is located, since the touch trace varies depending on a moving touch location. If it is determined in operation 380 that content is located on the recognized touch trace, the process may proceed to operation 390, and if it is determined in operation 380 that no content is located on the recognized touch trace, the process may return to operation 360. In operation 390, it is determined whether the content located on the touch trace corresponds to content already stored. If it is determined in operation 390 that the content located on the touch trace corresponds to no content already stored, the process may return to operation 340, and if it is determined in operation 390 that the content located on the touch trace corresponds to content already stored, the process may proceed to operation 360.

In addition, a predetermined effect (a predetermined color or shape) may be applied to the touch trace, and the resultant touch trace may be displayed on the screen. In other words, when a user has touched a predetermined location on a screen using his/her body part or the electronic pen 105 and drags the touch location to a new location, that is, when a user has made drawing on a screen using his/her body part or the electronic pen 105, a predetermined effect may be applied to the corresponding touch locations and the resultant touch trace may be displayed on the screen. The predetermined effect may be the same effect as if a user draws a picture using a predetermined pen, pencil, colored pencil, or brush. The predetermined effect may depend on the user's setting.

In FIG. 4, a case in which contents of an image, video, and text displayed on a screen are selected and stored by the content scraping method according to an embodiment of the present disclosure is shown. If a user draws a trace in the form of a line on the image, the video, and the text using the electronic pen 105, as illustrated in FIG. 4A to FIG. 4D, a line trace is displayed such that the image, the video, and the text can be scrapped in this order according to the content scraping method according to an embodiment of the present disclosure.

Figure 5A:
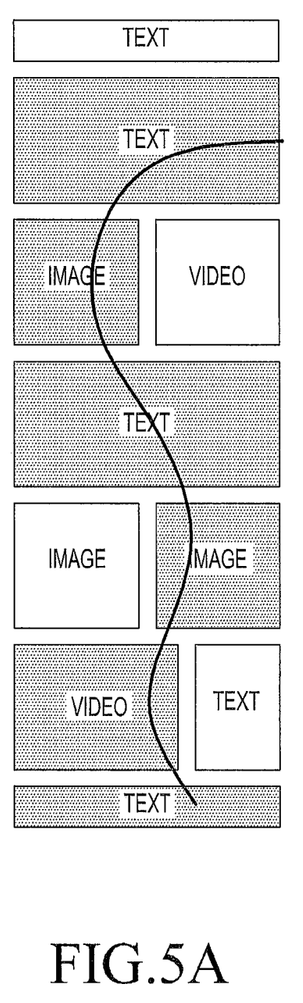
FIGS. 5A to 5B illustrate views for describing a content scraping method according to an embodiment of the present disclosure.
Figure 5B:
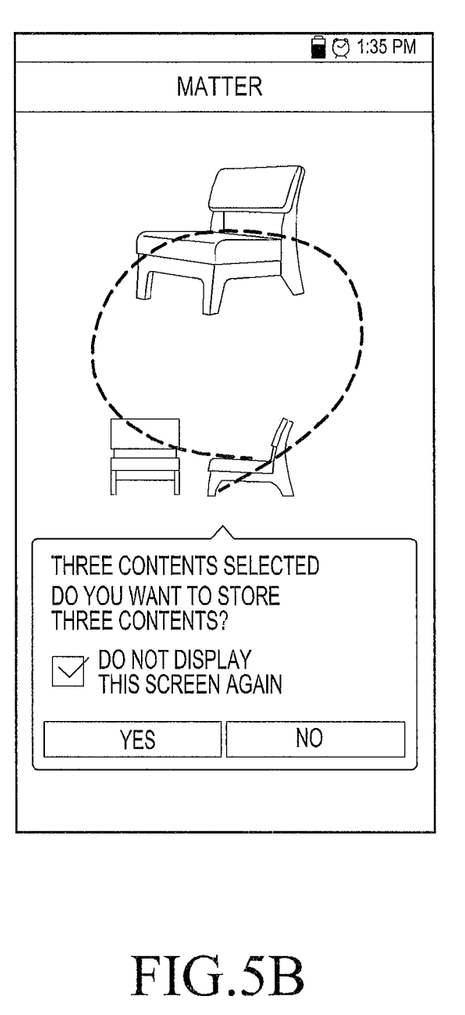

Referring to FIG. 5A, a plurality of contents (text, images, and video) located on a touch trace can be scrapped according to the content scraping method according to an embodiment of the present disclosure. If drawing is made in the form of a line as illustrated in FIG. 5B, a trace in the form of the drawn line may be displayed according to the content scraping method according to an embodiment of the present disclosure. In addition, when a user makes drawing in the form of a line as illustrated in FIG. 5B, a pop-up window asking a user about whether to store selected contents may be displayed. That is, when drawing is made on areas in which contents are located on a screen, a pop-up window asking a user about whether to execute a content scraping function according to an embodiment of the present disclosure may be displayed on the screen.

In addition, stored contents, that is, scrapped contents may be displayed as a pop-up window on the screen in order to allow a preview. Also, the pup-up window may include editing functions for editing the contents displayed on the pop-up window.

Figure 6A:
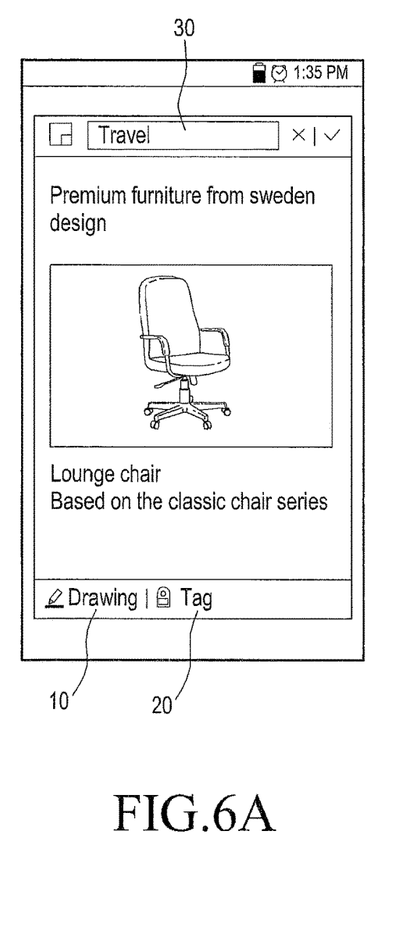
FIGS. 6A and 6B illustrate screens displaying scrapped contents having editing functions, according to an embodiment of the present disclosure.
Figure 6B:
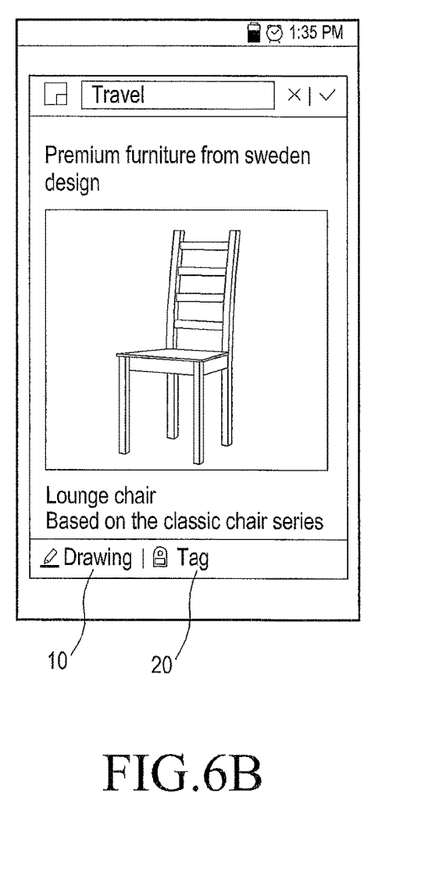
Figure 7A:
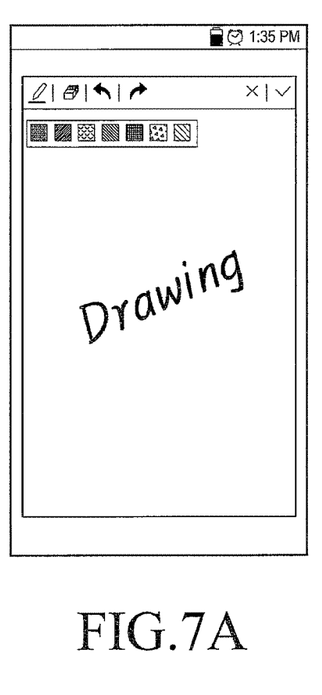
FIGS. 7A to 7D illustrate views for describing examples of editing functions selected from a screen shown in FIGS. 6A to 6B.
Figure 7B:
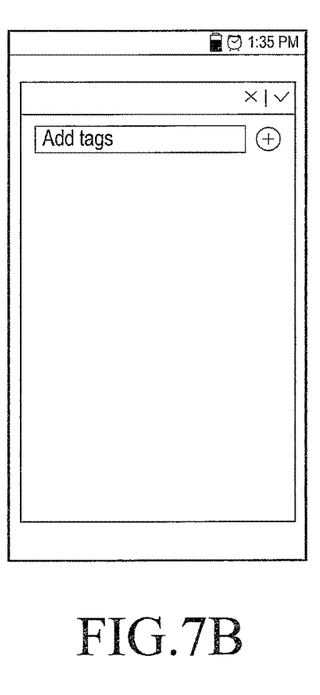
Figure 7C:
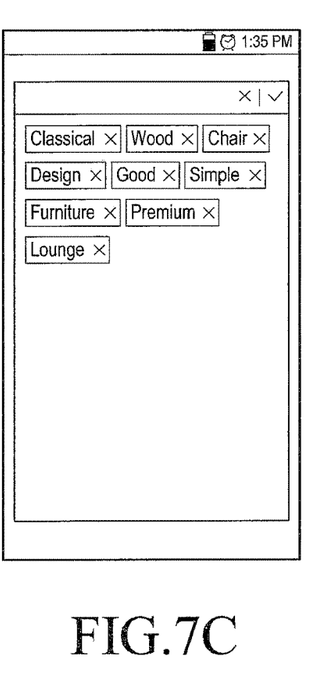
Figure 7D:
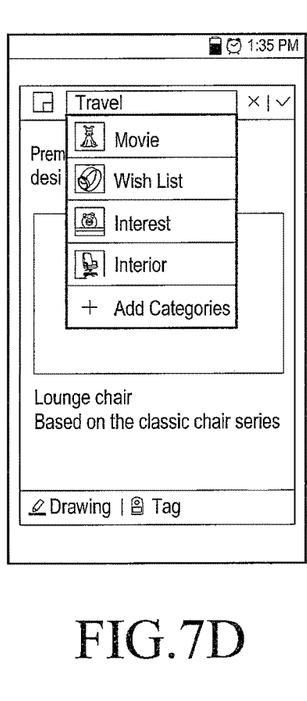

Referring to FIGS. 6A and 6B, scrapped content may be an object including an image, text, and a Uniform Resource Locator (URL), and include editing functions. The editing functions may include a function 10 of adding a drawing memo, a function 20 of adding tags, and a function 30 of setting a category of the corresponding content. If the function 10 of adding the drawing memo is executed, a screen for allowing a user to input a memo may be displayed as illustrated in FIG. 7A. If the function 20 of adding tags is executed, a screen for allowing a user to add tags may be displayed as illustrated in FIGS. 7B and 7C. If the function 30 of setting the category of the content is executed, a screen for allowing a user to set one of various categories may be displayed as illustrated in FIG. 7D.

Figure 8A:
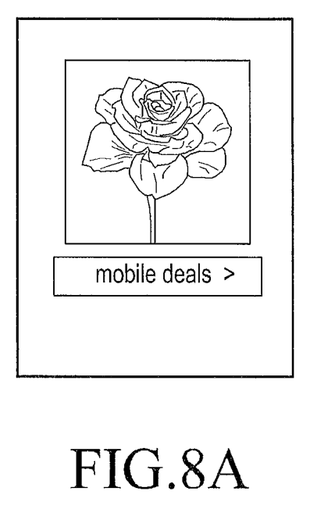
FIGS. 8A and 8B illustrate views for describing a content scraping method according to another embodiment of the present disclosure.
Figure 8B:
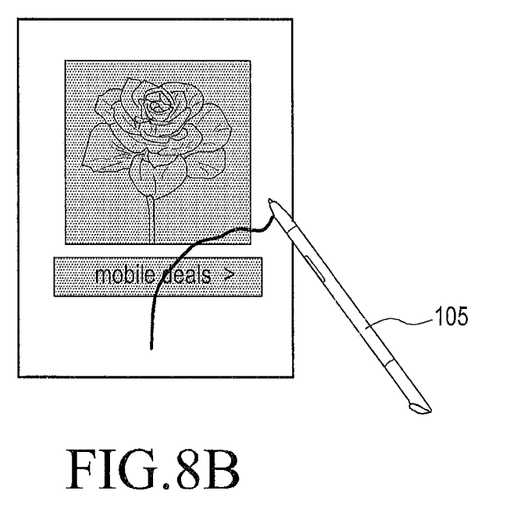

According to another embodiment of the present disclosure, all contents selected by drawing may be scrapped as one content. If a touch input is released after a touch trace according to a touch location moving to correspond to the touch input has been recognized on a screen, at least one content located on the touch trace may be selected, and the selected content may be stored as one content. If drawing is made on areas in which text and an image are located on a screen as illustrated in FIG. 8A to draw a trace as illustrated in FIG. 8B, the text and the image may be scrapped as one content.

Figure 9:
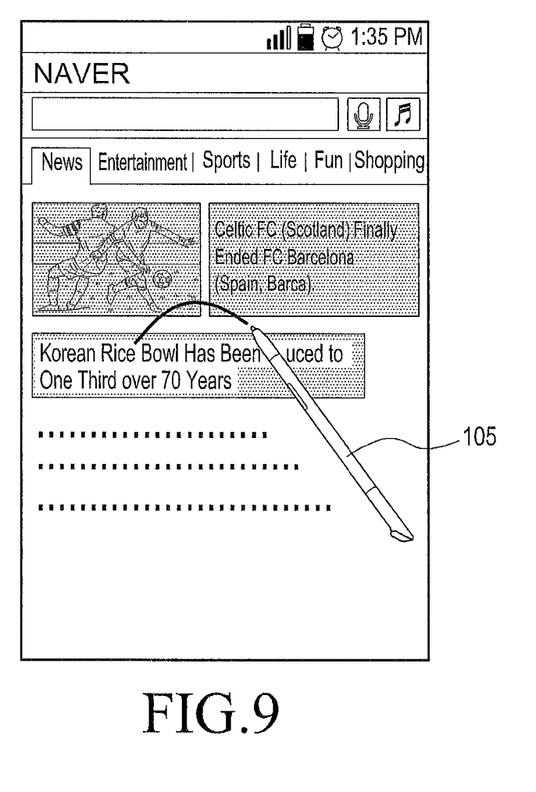
FIG. 9 illustrates a view for describing a content scraping method according to another embodiment of the present disclosure.

As illustrated in FIG. 9, if drawing is made on areas in which an image and two pieces of text are located to draw a trace as illustrated in FIG. 9, the image and the two pieces of text may be scrapped as one content.

Configurations and operations of the method, apparatus, and recording medium for scrapping content, according to embodiments of the present disclosure have been described above, however, various changes and modifications of the embodiments described herein can be made. For example, all or a part of operations described in this specification may be simultaneously performed in parallel, a part of the operations may be omitted, or other operations may be additionally performed.

In addition, when a user redraws a touch trace once drawn in the reverse direction, selections of already selected contents may be released. For example, if, after drawing is made along locations of first content, second content, and third content in this order to draw a trace, drawing is again made along the locations of the third content, the second content, and the first content in this order to redraw a trace, selections of the first content, the second content, and the third content selected according to the operation of drawing the trace by making the drawing along the locations of the first content, the second content, and the third content may be released.

Also, in order to visually distinguish selected content from non-selected content on a screen, it is possible to change at least one of the shape and color of the selected content.

By using the method, apparatus, and recording medium for scrapping content according to the embodiments of the present disclosure as described above, it is possible to capture and store content, such as an image and text, in its original state. That is, unlike an existing clipping method, it is possible to cleanly and accurately scrap desired content.

Also, by using the method, apparatus, and recording medium for scrapping content according to the embodiments of the present disclosure as described above, it is possible to simultaneously scrap a plurality of contents through a simple manipulation.

It will be appreciated that embodiments of the present disclosure can be realized in the form of hardware, software, or a combination of hardware and software. Any such software may be stored in volatile or non-volatile storage such as, for example, a storage device like a ROM, whether erasable or rewritable or not, in memory such as, for example, RAM, memory chips, device or integrated circuits, or in an optically or magnetically writable, machine (e.g., a computer)-readable medium such as, for example, a Compact Disk (CD), Digital Versatile Disk (DVD), magnetic disk or magnetic tape or the like. The memory that can be included in the mobile terminal is an example of a machine-readable storage medium suitable to store a program or programs including instructions for implementing embodiments of the present disclosure. Accordingly, embodiments of the present disclosure include a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an example embodiment, various changes and modifications may be suggested to one skilled in the art. It is intended that the present disclosure encompass such changes and modifications as fall within the scope of the appended claims.

What is claimed is:

1. A content scraping method comprising:
displaying a first content including a plurality of objects which is provided by an external electronic device on a screen;
recognizing a touch trace made on the screen according to a touch input;
identifying objects located on the touch trace;
identifying at least one object among the objects located on the touch trace, wherein the at least one object comprises same type;
in response to identifying the touch input being released, displaying a pop-up window for displaying a single second content including the at least one object;
based on receiving, on the pop-up window, a first user input for editing the single second content to add a first object into the single second content, providing the edited single second content including the first object and the at least one object; and
in response to receiving a second user input for storing the edited single second content based on the pop-up window, storing the single second content including the at least one object in a memory, wherein after the edited single second content is stored in the memory, the first content including the plurality of objects is maintained to be displayed on the screen.

2. The content scraping method of claim 1, wherein if it is determined that second content has been already stored, the second content is not stored.

3. The content scraping method of claim 1, further comprising based on receiving the second user input for editing the single second content, setting a category of the single second content, and
wherein the first object includes at least one of tags, or a memo.

4. The content scraping method of claim 1, further comprising displaying a second object corresponding to the touch trace on the screen.

5. The content scraping method of claim 4, wherein the displaying the second object corresponding to the touch trace on the screen comprises displaying the second object corresponding to the touch trace to which a predetermined color and a predetermined shape are applied, on the screen.

6. The content scraping method of claim 1, further comprising changing at least one of a shape and a color of the at least one object, and displaying a resultant content including the changed at least one object.

7. The content scraping method of claim 1, wherein the touch input includes at least one of a direct touch input, a hovering event, and a hovering event that is recognized while a button mounted in a touch type input unit is pressed.

8. A content scraping apparatus comprising:
a touch screen;
a storage unit; and
a controller configured to:
display a first content including a plurality of objects which is provided by an external electronic device on the touch screen,
recognize a touch trace made of the touch screen according to a touch input,
identify objects located on the touch trace,
identify at least one object among the objects located on the touch trace, wherein the at least one object comprises same type,
in response to identifying the touch input being released, display a pop-up window for displaying a single second content including the at least one object,
based on receiving, on the pop-up window, a first user input for editing the single second content to add a first object into the single second content, provide the edited single second content including the first object and the at least one object, and
in response to receiving a second user input for storing the edited single second content, store the single second content including the at least one object in the storage unit, wherein after the edited single second content is stored in the storage unit, the first content including the plurality of objects is maintained to be displayed on the touch screen.

9. The content scraping apparatus of claim 8, wherein the edited single second content is not stored, if it is determined that the edited single second content has been already selected and stored.

10. The content scraping apparatus of claim 8, wherein the controller is further configured to:
based on receiving the second user input for editing the single second content, set a category of the single second content, and
wherein the first object includes tags, a memo.

11. The content scraping apparatus of claim 8, wherein the controller is further configured to control the touch screen to display a second object corresponding to the touch trace of the touch screen.

12. The content scraping apparatus of claim 11, wherein the controller is further configured to control the touch screen to display the second object corresponding to the touch trace to which a predetermined color and a predetermined shape are applied, on the touch screen.

13. The content scraping apparatus of claim 8, wherein the controller is further configured to change at least one of a shape and a color of the at least one object, and control the touch screen to display a resultant content including the changed at least one object.

14. The content scraping apparatus of claim 8, wherein the touch input includes at least one of a direct touch input, a hovering event, and a hovering event that is recognized while a button mounted in a touch type input unit is pressed.

15. A non-transitory computer-readable recording medium having recorded thereon, a computer program for executing a content scraping method, the content scraping method comprising:
displaying first content including a plurality of objects which is provided by an external electronic device on a screen;
recognizing a touch trace made on the screen according to a touch input;
identifying objects located on the touch trace;
identifying at least one object among the objects located on the touch trace, wherein the at least one object comprises same type;
in response to identifying the touch input being released, displaying a pop-up window for displaying a single second content including the at least one object;
based on receiving, on the pop-up window, a first user input for editing the single second content to add a first object into the single second content, providing the edited single second content including the first object and the at least one object and
in response to receiving, on the pop-up window, a second user input for storing the edited single second content, storing the single second content including the at least one object in a memory, wherein after the edited single second content is stored in the memory, the first content including the plurality of objects is maintained to be displayed on the screen.

16. The content scraping method of claim 1, wherein the same type includes one of an image type, a video type, or a text type.

17. The content scraping apparatus of claim 8, wherein the same type includes one of an image type, a video type, or a text type.

* * * * *